United States Patent

[11] 3,623,092

| | | | |
|---|---|---|---|
| [72] | Inventor | Robert P. Farnsworth<br>Los Angeles, Calif. |
| [21] | Appl. No. | 736,934 |
| [22] | Filed | June 6, 1968 |
| [45] | Patented | Nov. 23, 1971 |
| [73] | Assignee | Hughes Aircraft Company<br>Culver City, Calif. |

[54] MULTIPLE COUNTER GATING WITH JK ELEMENTS
39 Claims, 28 Drawing Figs.

[52] U.S. Cl.................................................. 343/7 A,
343/5 DP, 324/186
[51] Int. Cl.............................................. G01s 7/02,
G01s 9/04
[50] Field of Search........................................... 343/5 DP, 7
RS, 7 A; 324/68 C, 186

[56] References Cited
UNITED STATES PATENTS
3,235,796 2/1966 Tarcey-Hornoch.......... 324/68
3,246,324 4/1966 Price........................... 343/5 DP X Primary Examiner—T. H. Tubbesing
Attorneys—James K. Haskell and Robert Thompson ABSTRACT: A range gate circuit including two serially connected flip-flops for producing a pulse train output signal derived from a clock pulse signal during the interval of time between gate signals that correspond to transmitted range pulse signals and reflected energy signals. A plurality of the individual gate means are further connected in parallel circuit relationship in which each of the gate means is connected to another gate means so that the pulse train from each of the gate means is initiated simultaneously by the gate signals corresponding to transmitted range pulse signals and are sequentially discontinued by sequentially received reflected energy signals received from a plurality of targets whereby the range of the targets can be determined from the pulse counts of the pulse trains.

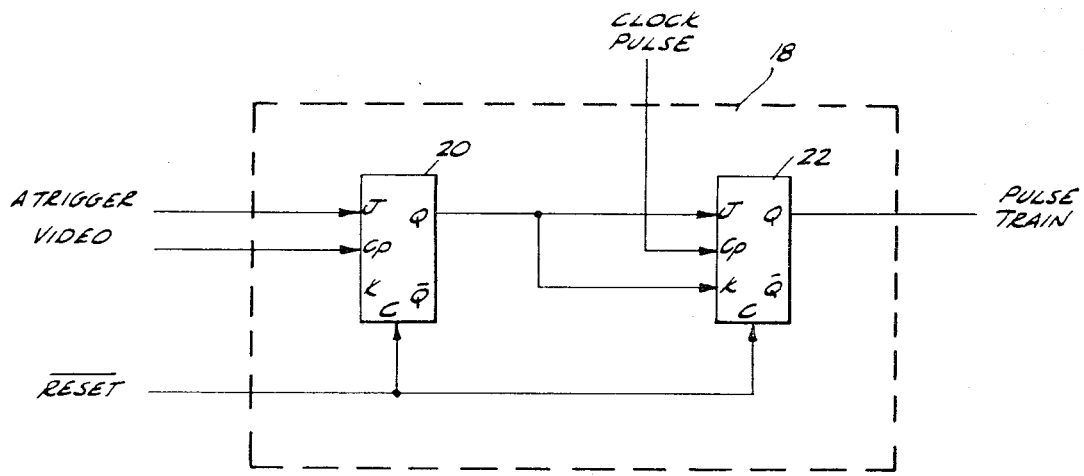
FIG. 1.
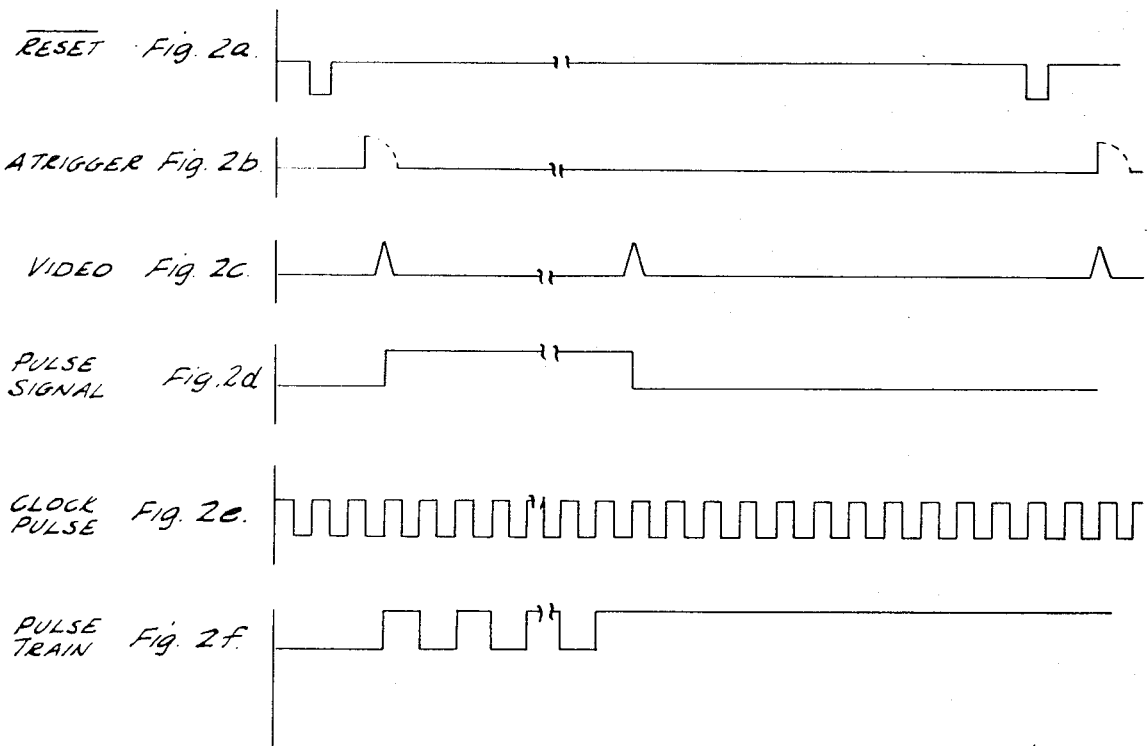
INVENTOR.
ROBERT P. FARNSWORTH,
BY
Robert Thompson
ATTORNEY.

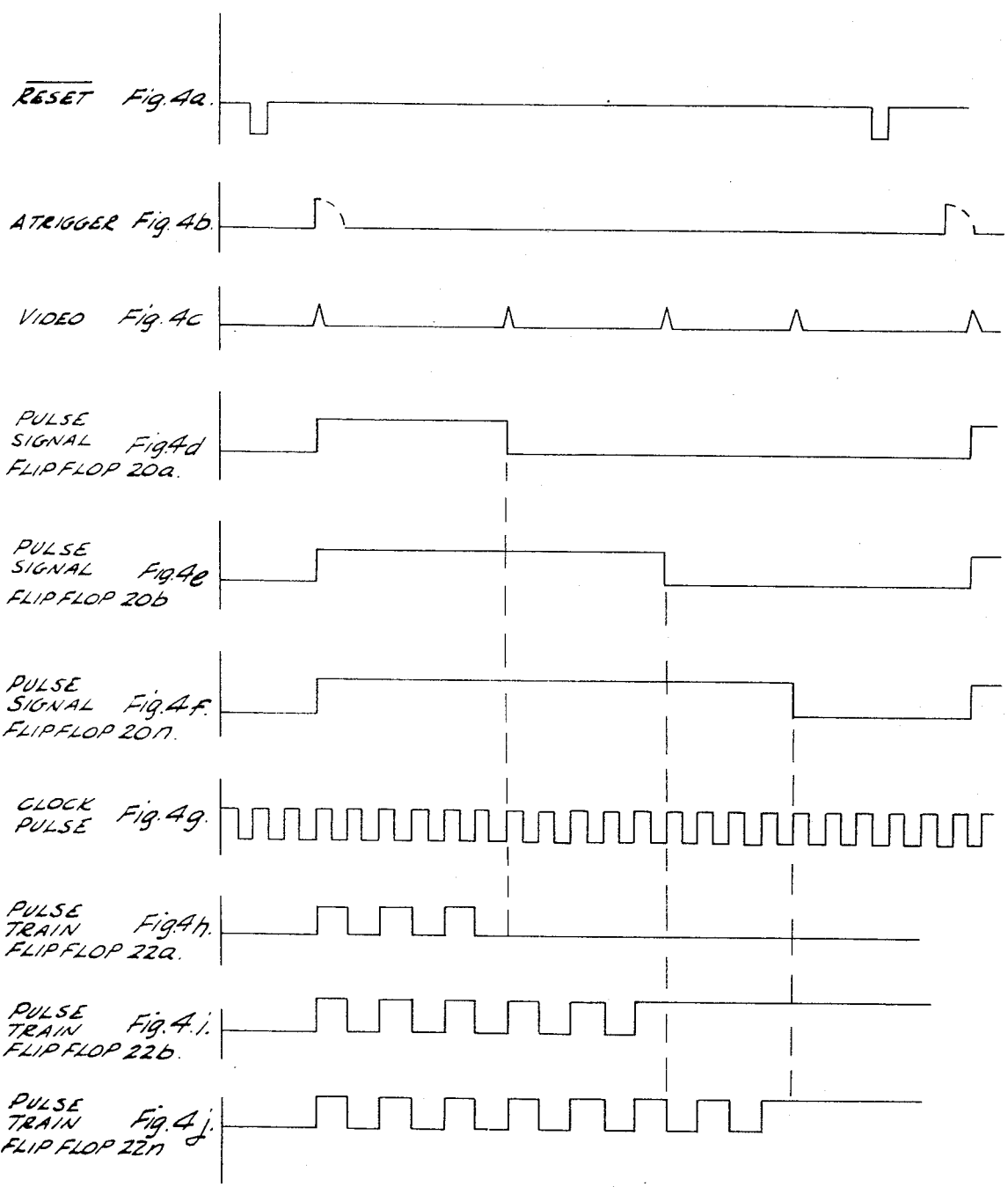

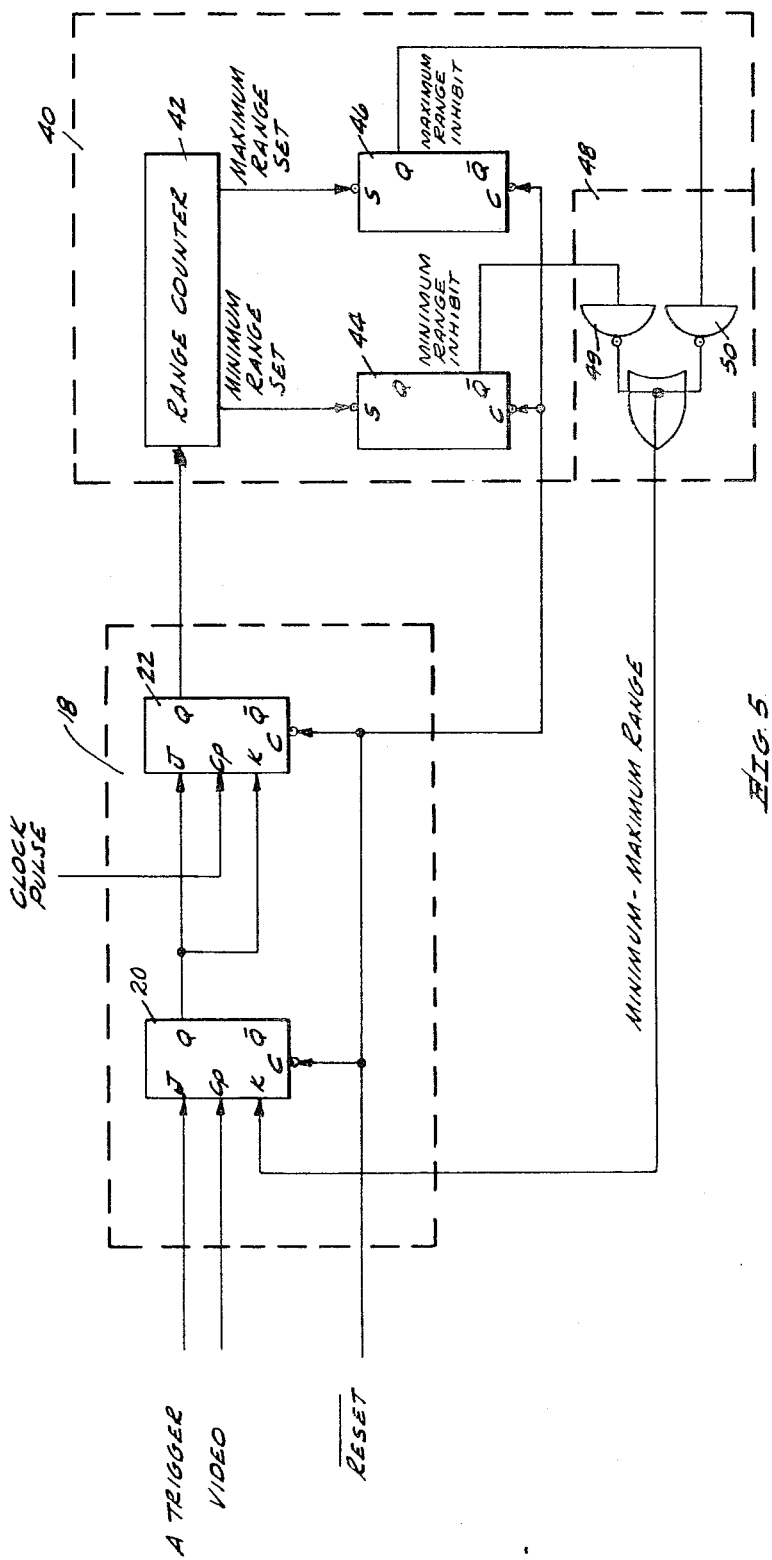

SHEET 5 OF 7
RESET Fig.6a.
A TRIGGER Fig.6b.
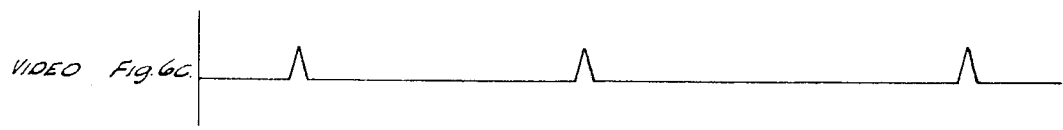
VIDEO Fig.6c.
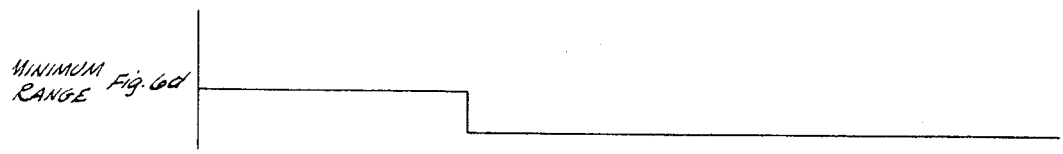
MINIMUM RANGE Fig.6d.
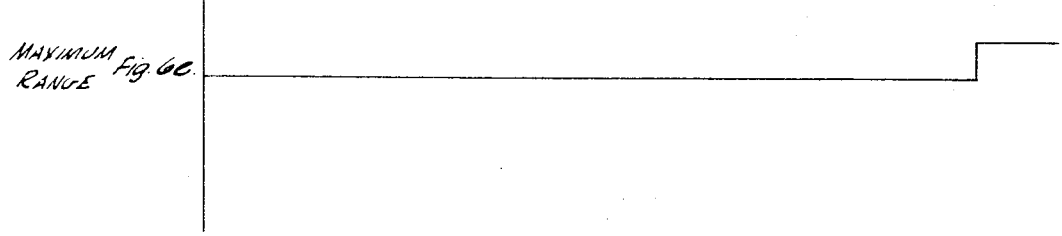
MAXIMUM RANGE Fig.6e.
CLOCK PULSE Fig.6f.
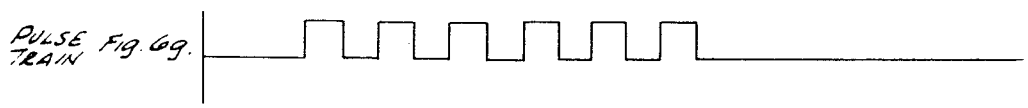
PULSE TRAIN Fig.6g.

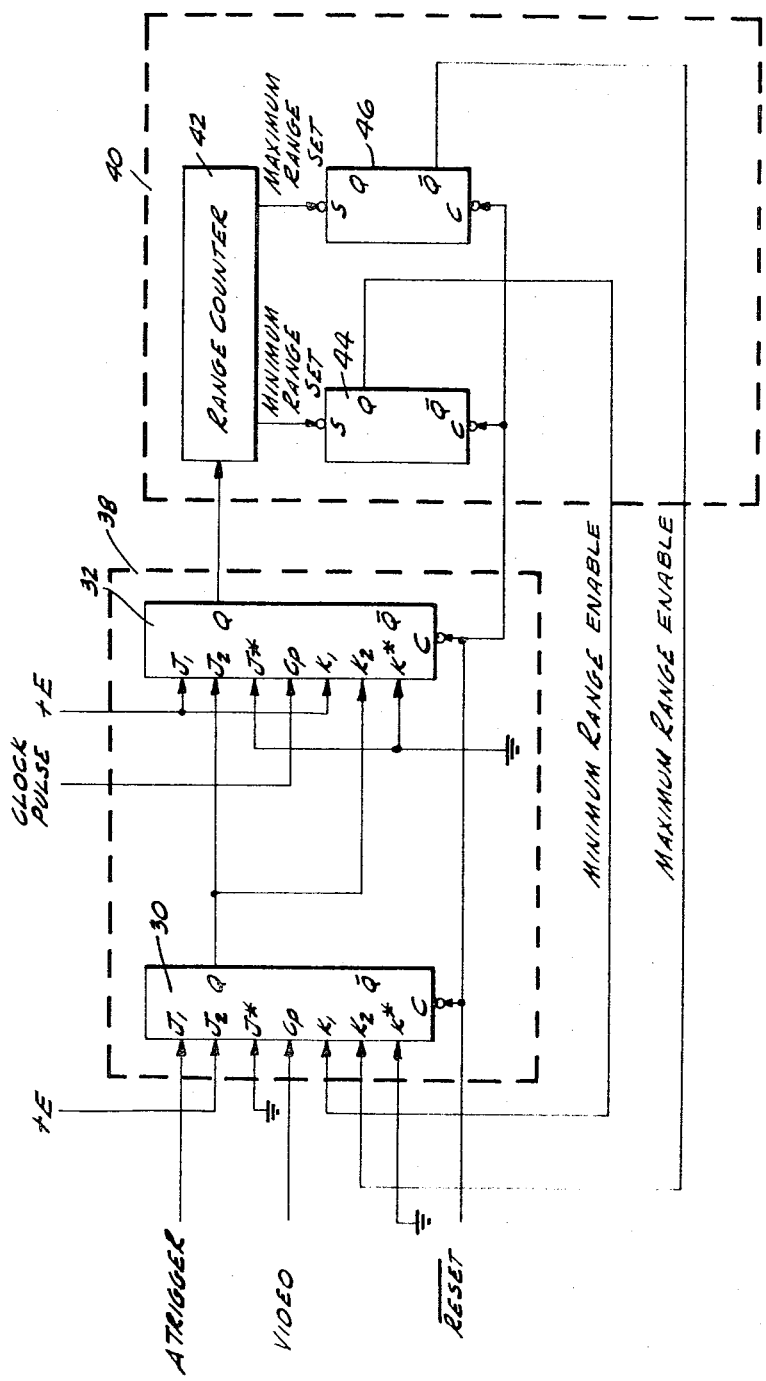

MULTIPLE COUNTER GATING WITH JK ELEMENTS

BACKGROUND OF THE INVENTION

This invention relates, in general, to digital ranging and more particularly to an improved means for gating clock pulses to a range counter.

In digital ranging systems the range of a target has been determined by counting the accumulative number of clock pulses that occur from the time a range pulse is transmitted toward a target until a reflected energy signal is received. The accumulative count is converted to range by knowing the range increment corresponding to each clock pulse from the propagation velocity of the pulse and the frequency of the clock pulses.

For example, in a radar or laser ranging system, a range pulse has been transmitted toward a target of which the range is desired. Starting when the range pulse is transmitted, clock pulses are applied to a range counter which accumulatively counts the clock pulses. When the reflected energy signal is received by the ranging system, the application of clock pulses to the counter is discontinued and the range is determined by converting the accumulated clock pulses to range.

Since it was desired to apply the clock pulses to the range counter only during ranging, the clock pulses were gated to the range counter in response to the transmitted pulses. The gating circuitry required has been either complex or susceptible to transient modulation. In addition, the leading edges of the pulses have been modulated by gating transients which could cause erroneous counts.

SUMMARY OF THE INVENTION

Accordingly, it is an object of this invention to provide improvements in a circuit for gating clock pulses to a range counter in a ranging system.

Another object of this invention is to provide improvements in a circuit for gating clock pulses to range counters during the interval of time that a range pulse is transmitted until reflected energy is received from a plurality of objects.

Yet another object of this invention is to provide a circuit for producing pulse trains when a first VIDEO signal is received, and to stop producing the pulse train when VIDEO signals are received from objects within certain range limits.

The above and other objectives of this invention can be attained by a circuit having a gate means that is coupled to receive a plurality of gate signals, including an A TRIGGER signal, VIDEO signals, and a CLOCK PULSE signal for producing a pulse train output signal in response thereto. The pulse train is initiated when a VIDEO signal corresponding to a transmitted range pulse is received by the gate means coincident with an A TRIGGER signal, and is discontinued when a subsequent VIDEO signal resulting from reflected energy signals is received.

In another embodiment of the range gate circuit for simultaneously obtaining ranges of a plurality of targets, there is provided a plurality of gate means, in which each of the gate means is coupled to receive an A TRIGGER signal, VIDEO signals, and a CLOCK PULSE signal for producing a pulse train output signal. The pulse train produced by each of the gate means is simultaneously initiated when a VIDEO signal corresponding to a transmitted range pulse is received by the plurality of n gate means coincident with an A TRIGGER signal. Each of the gate means after or subsequent to the first is responsive to the condition of the preceding gate means such that the pulse train output of each of the gate means is sequentially discontinued as reflected energy signals from a plurality of targets are sequentially received. For example, the pulse train produced by the first gate means is discontinued when a VIDEO signal resulting from range pulse energy reflected from a first target is received. The pulse train produced by the subsequent gate means is discontinued when a subsequent VIDEO signal corresponding to range pulse energy reflected from a second target is received. The sequence of sequentially discontinuing the producing of the pulse train by the plurality of gate means continues until the pulse train produced by the last gate means is discontinued when the VIDEO signal corresponding to range pulse energy reflected from an nth target is received, where n is an integer equal to the number of gate means.

In another embodiment of the gate circuit for determining the range of a target within minimum and maximum range limits, there is included a gate means and a counter means. The gate means is coupled to receive a plurality of gate signals including an A TRIGGER signal, VIDEO signals, a CLOCK PULSE signal and a MINIMUM-MAXIMUM RANGE signal for producing a pulse train output signal in response thereto. The pulse train is initiated when a VIDEO signal corresponding to a transmitted range pulse is received by the gate means coincident with an A TRIGGER signal, and is discontinued when a subsequent VIDEO signal resulting from reflected range pulse energy is received coincident with the MINIMUM-MAXIMUM RANGE signal. In operation, the counter means receives the pulse train signal produced by the gate means and performs count operations thereon for producing the MINIMUM-MAXIMUM RANGE signal only when the counter contains a count between an upper and lower limit.

In another embodiment of the range gate circuit for simultaneously obtaining ranges of a plurality of targets that are within certain minimum and maximum range limits, there is provided a plurality of gate means and a counter means. A plurality of pulse trains, each produced by one of the gate means, is simultaneously initiated when a VIDEO signal corresponding to a transmitted range pulse is received by the plurality of n gate means coincident with an A TRIGGER signal. Each of the gate means subsequent to the first is responsive to the condition of the preceding gate means such that the pulse train output of each of the n-gate means is sequentially discontinued as reflected energy signals from a plurality of targets are sequentially received. For example, the pulse train produced by the first gate means is discontinued when a first reflected VIDEO signal resulting from range pulse energy reflected from a first target is received subsequent to the MINIMUM RANGE signal and preceding a MAXIMUM RANGE signal. The pulse train produced by the second gate means is discontinued when a second reflected VIDEO signal corresponding to range pulse energy reflected from a second target is subsequently received. The sequence of sequentially discontinuing the pulse train produced by each subsequent gate means in response to the condition of the preceding gate means and a sequentially received reflected VIDEO signal continues until the pulse train produced by the last gate means is discontinued when the VIDEO signal corresponding to range pulse energy reflected from an nth target is received. In operation, the counter means receives the pulse train signal produced by the nth gate means and performs count operations thereon for producing the MINIMUM RANGE signal and the MAXIMUM RANGE signal in response to the received signal.

Other objects, features, and advantages of this invention will become apparent with reference to the following detailed description, taken in conjunction with the accompanying drawings, in which:

BRIEF DESCRIPTION OF THE DRAWINGS

FIG. 1 is a block diagram of an embodiment of this invention in which a gate means generates a pulse train in response to received gate signals;

FIGS. 2a-2f are signal diagrams of the signal waveforms associated with the gate means of FIG. 1;

FIGS. 4a-4j are signal diagrams of the signal waveforms associated with the multiple gate embodiment illustrated in FIG. 3;

FIG. 5 is a block diagram of another embodiment of this invention in which a gate means and a counter means operate to determine the range of a target that is within certain minimum and maximum range limits;

FIGS. 6a–6g are signal diagrams of signal waveforms associated with the embodiment illustrated in FIG. 5;

FIG. 7 is a block diagram of another embodiment of the invention for determining the range of a target that is within minimum and maximum range limits, in which the gate means includes a first flip-flop and a second flip-flop, each having a plurality of J inputs and a plurality of K inputs;

DESCRIPTION OF THE PREFERRED EMBODIMENTS

Figure 3:
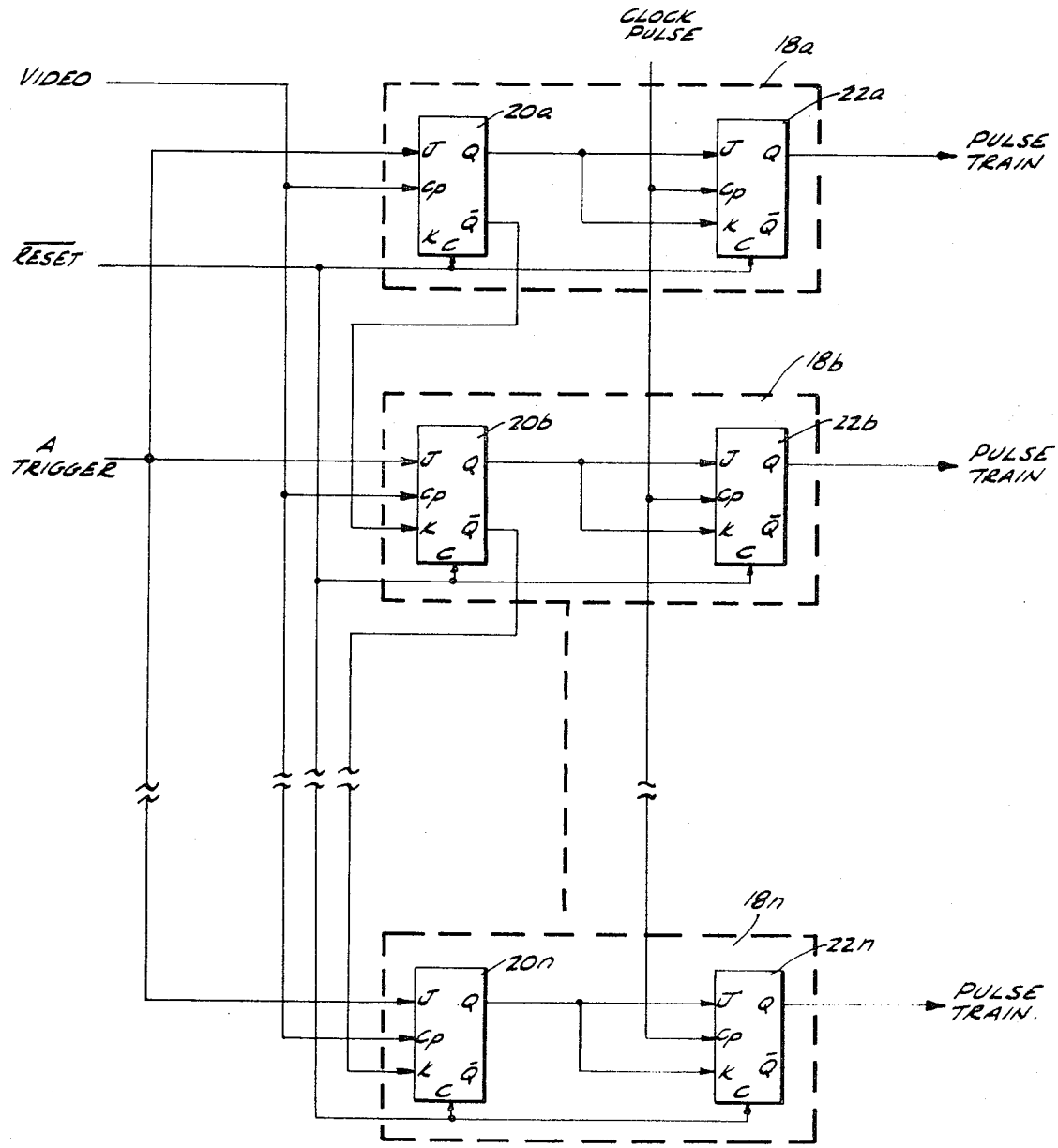
FIG. 3 is a block diagram of a multiple target range gate embodiment in which a plurality of gate means of the type illustrated in FIG. 1 is connected in parallel circuit relationship.

Referring now to the drawings, wherein like reference characters designate like or corresponding parts, there is shown in FIG. 1 a block diagram of a gate means 18 that is coupled to receive a plurality of gate signals and a CLOCK PULSE signal for producing a pulse train output signal in response to the received signal.

The gate means 18 includes a first flip-flop 20 and a second flip-flop 22. The first flip-flop 20 receives a first one of the gate signals or a $\overline{RESET}$ signal, shown in FIG. 2a, a second of the plurality of gate signals or an A TRIGGER signal, shown in FIG. 2b, and a third of the plurality of gate signals or a VIDEO signal, shown in FIG. 2c, to initiate a pulse signal, shown in FIG. 2d.

The A TRIGGER signal is derived from the transmitter of a ranging system and is generated each time a range pulse is transmitted. The A TRIGGER signal is characterized as having a fast rise time leading edge and a time duration sufficient to include the leading edge of the VIDEO signal illustrated in FIG. 2c. The VIDEO signal is a voltage pulse or spike of short duration that is received by the first flip-flop after a short processing delay whenever either a range pulse is transmitted by or whenever a reflected energy signal is received by the ranging system. In a laser ranging system, the A TRIGGER signal that is received when a range pulse is transmitted may be generated by a phototransistor (not shown). The VIDEO signal that is received when a range pulse is transmitted or when a reflected energy signal is received, may be derived from a photomultiplier tube and processed through the ranging system receiver (not shown). The $\overline{RESET}$ signal generated by a ranging system sets all subsystems to their required initial conditions before transmission of the range pulse. The $\overline{RESET}$ signal can be a negative rectangular pulse having sufficient duration to reset the flip-flops.

When the first flip-flop 20 receives the A TRIGGER and the VIDEO signal in coincidence, the Q output goes high until the return to VIDEO is received to thereby produce a pulse signal having a duration equal to the time interval between the received VIDEO signals.

The second flip-flop 22 receives the pulse signal from the Q output of the first flip-flop 20 and a timing signal (FIG. 2e), and is triggered to produce a pulse train (FIG. 2f), having a frequency related to the frequency of the CLOCK PULSE signal and a time duration proportional to the time between transmitted and received video pulses or only when the output pulse signal is received from the first flip-flop 20. The CLOCK PULSE signal is a constant frequency signal which, for precise ranging, can be generated by a crystal oscillator.

More specifically, the first flip-flop 20 and the second flip-flop 22 can be J-K flip-flops such as SN 5470 J-K flip-flops that are manufactured by Texas Instruments, Incorporated, and described in their 1967–68 Integrated Circuits Catalog, p. 1,015.

J-K flip-flops of the type referred to above operate such that the state of the outputs of the flip-flop changes state when both the J and K inputs are enabled or high and a clock pulse is received at the clock pulse input. The output of the flip-flops will not change state when both the J and K inputs are inhibited or low and a clock pulse is received at the clock pulse input. If the K terminal is enabled and the J terminal inhibited, a clock pulse will clear the flip-flop or hold it in the cleared state if already there. If the J terminal is enabled and the K terminal inhibited, a clock pulse will set the flip-flop or hold it in the set state if already there. Furthermore, when using the type of flip-flop referred to above, if the K terminal of the flip-flop is not connected or open, the flip-flop operates as if the K input is high or in the 1 state.

The above described logic operation is further illustrated by the following truth table.

| J | K | $Q_{(n+1)}$ |
|---|---|---|
| 0 | 0 | $Q_n$ |
| 1 | 0 | 1 |
| 0 | 1 | 0 |
| 1 | 1 | $\overline{Q_n}$ |

$Q_n$ = status of Q output prior to initiation signal. $Q(n+1)$ = status of Q output after initiation of the signal.

Referring now to the detailed operation of the circuit illustrated in FIG. 1, the $\overline{RESET}$ pulse is received by the gate means 18 and puts the first flip-flop 20 and the second flip-flop 22 into the required initial conditions, such that outputs Q = 0, and $\overline{Q}$ = 1. With the J input of the first flip-flop 20 in the low state, any VIDEO signal that is received at the clock pulse input c.p. of the first flip-flop 20 prior to an A TRIGGER signal will not cause a change of state of the outputs of the flip-flops. Subsequently, when an A TRIGGER signal is received, the J input of the first flip-flop 20 is high and remains high for the duration of the A TRIGGER signal, which enables the Q and $\overline{Q}$ outputs to change state when a VIDEO signal is received at the clock pulse input c.p. of the first flip-flop 20. Thus, when a VIDEO signal is received coincident with an A TRIGGER signal, the output of the first flip-flop 20 changes state such that Q = 1 and $\overline{Q}$ = 0. When the Q output of the first flip-flop 20 is high, the J and K inputs of the second flip-flop 22 which receive the Q output signal are high and enable the second flip-flop 22 so that the output of the second flip-flop 22 will trigger with each positive-going leading edge of the clock pulse received at its clock pulse input c.p. Thus, the pulse train is produced on the Q output of the second flip-flop 22. The pulse train will be generated as long as the J and K inputs of the second flip-flop 22 are high. The J and K inputs to the second flip-flop 22 will remain high for the duration that the Q output signal from the first flip-flop 20 is high, and the Q output signal from the first flip-flop 20 will remain high until another VIDEO signal is received.

When a VIDEO signal due to the reflected energy signal is received by the clock pulse input c.p. of the first flip-flop 20, the Q output of the first flip-flop 20 changes state such that the Q output goes low which causes the pulse signal to be effectively terminated. As a result, the J and K inputs of the second flip-flop 22 go low, which prevents the output of the second flip-flop 22 from being triggered when the next clock pulse is received, thereby terminating the pulse train. The accumulative count of the pulses in the pulse train can then be converted to range.

An advantage of this gate means 18 is that a plurality of them can be embodied into a range gate circuit for determining the ranges of a plurality of targets. Referring now to FIG. 3, there is shown a multiple gate means of the type illustrated in FIG. 1 connected in parallel circuit relationship for determining the range of a plurality of targets. Therefore, when a first VIDEO signal is received during an A TRIGGER signal, all the gate means 18a through 18n start generating pulse trains. Subsequently, when a first reflected VIDEO signal is received, the pulse train from the first of the plurality of gate means 18a is stopped and the second of the plurality of gate means 18b is enabled so that the next reflected VIDEO signal will stop the pulse train from being generated from the second of the plurality of gate means 18b. Consequently, when the second reflected VIDEO signal is received, the second of the plurality of gate means 18b stops producing a pulse train. The sequence of turning off the subsequent gate means continues until an nth reflected VIDEO signal is received which stops the generating of the pulse train by the nth of the plurality of gate means 18n. More specifically, the K input of the first flip-flop 20b of the second gate means 18b is coupled to the $\overline{Q}$ output of the first flip-flop 20a of the first gate means 18a, and the K inputs of each of the first flip-flops of the subsequent gate means is coupled to receive the $\overline{Q}$ output of the first flip-flop of the preceding gate means until the K input of the first flip-flop 20n of the nth gate means 18n is coupled to receive the Q output of the first flip-flop of the n−1 gate means.

Each of the plurality of gate means receives the $\overline{\text{RESET}}$ pulse, A TRIGGER signal, VIDEO signal and the CLOCK PULSE signal as previously described herein for FIG. 1. These signals are reproduced in FIG. 4a, 4b, 4c, and 4g, respectively, for clarity. The $\overline{\text{RESET}}$ pulse sets all the plurality of flip-flops to the required initial conditions for circuit operations with the Q outputs of all the plurality of flip-flops set to 0, and the $\overline{Q}$ outputs set to 1. Since the Q output of all of the first flip-flops are in the 0 state, the J and K inputs of the plurality of second flip-flops are 0 which prevents the outputs of the second flip-flops from changing state, when the clock pulse signal is received. It should be noted that a high output is equivalent to a 1 and that a low output is equivalent to a 0.

When an A TRIGGER signal is received by each of the plurality of gate means, the J inputs of the plurality of first flip-flops go high which enables the output of each of the plurality of first flip-flops to change state when a VIDEO signal is received at the clock pulse input c.p. during the A TRIGGER signal time. When a VIDEO signal is received at the clock pulse input c.p. of each of the plurality of first flip-flops 20a through 20n during the A TRIGGER signal time, all the Q outputs of the plurality as illustrated in FIG. 4d, FIG. 4e and FIG. 4f respectively, of the first flip-flops 20a–20n, go to the 1 state and the $\overline{Q}$ outputs to to a 0 state. When the output of all of the first flip-flops go to the one state an output pulse signal from each of the flip-flops is produced. For example, if three gate means were used in parallel circuit relationship, as described above, the pulse output of the flip-flops 20a, 20b and 20n would be as illustrated in FIG. 4e and FIG. 4f respectively. When the Q output of the plurality of first flip-flops 20a–20n are in the 1 state, both the J and K inputs of the plurality of second flip-flops 22a–22n which are coupled to the Q output of the plurality of first flip-flops 20a– 20n are high, thereby enabling the outputs of the plurality of second flip-flops 22a–22 to change state for producing individual pulse train output signals as illustrated in FIG. 4h, FIG. 4i and FIG. 4j respectively, when a positive-going leading edge of the CLOCK PULSE signal is received at the clock pulse input c.p.

With the $\overline{Q}$ outputs of the plurality of first flip-flops 20a–20 in the 0 state, the K inputs of all but the first flip-flop 20a of the first of the plurality of gate means 18a are at a 0 state, and will not change state when the first reflected VIDEO signal is received at the clock pulse input c.p. When the first reflected VIDEO signal is received by the plurality of the first flip-flops 20a–20n of the plurality of gate means 18a–18n, the Q and $\overline{Q}$ outputs of the first flip-flop 20a of the first gate means 18a changes state such that the Q output returns to the 0 state, as illustrated in FIG. 4d, and Q goes to 1. When the Q output of the first flip-flop 20a goes to 0, the J and K inputs of the second flip-flop 22a of the gate means 18a go to 0, which prevents the Q output of the second flip-flop 22a output from changing state when the next positive-going clock pulse edge is received at the clock pulse input c.p. which, in turn, stops the pulse train from the first of the plurality of gate means 18a from being produced as illustrated in FIG. 4h. Also, when the $\overline{Q}$ output of the first flip-flop 20a, which is coupled to the K input of the first flip-flop 20b of the second gate means 18b goes high, the K input of the first flip-flop 20b goes high. When the K input of the first flip-flop 20b goes high, flip-flop 20b will be triggered when a second reflected VIDEO signal is received at the clock pulse input c.p.

When the second reflected VIDEO signal is received by the clock pulse input c.p. of the first flip-flop 20b of the second gate means 18b, the outputs of the first flip-flop 20b change state, as illustrated in FIG. 4e, such that Q output of the first flip-flop 20b goes to the 0 state and $\overline{Q}$ goes to the 1 state. When the Q output of the first flip-flop 20b goes to the 0 state and is applied to the J and K inputs of the second flip-flop 22b, the second flip-flop 22b will be prevented from changing state when the next positive-going clock pulse edge is received, thereby stopping the pulse train produced by the second gate means 18b as illustrated in FIG. 4i.

The sequence of stopping the generation of the pulse train of succeeding gate means continues until the first flip-flop 20n of the nth gate means 18n one of the n gate means is responsive to the nth reflected VIDEO signal at which time the pulse signal produced by the flip-flop 20n will go low or to the 0 state as illustrated in FIG. 4f, stopping the pulse train produced by the flip-flop 22n as illustrated in FIG. 4j.

Referring now to FIG. 5, there is shown another embodiment of this invention in which only the range of a target that is within certain minimum and maximum range limits is determined.

If a VIDEO signal due to target reflection is received after the minimum range is reached and prior to the maximum range, the pulse train produced by the gate means 18 and fed to the range counter 42 will be terminated, and the accumulated count of pulses in the counter can be converted to range.

In this embodiment, there is a gate means 18 and a counter means 40. The counter means 40 includes a range counter 42, a minimum range flip-flop 44, a maximum range flip-flop 46, and a gate circuit 48. The range counter 42 can be a counter having a plurality of serially connected flip-flops in which the output of each flip-flop corresponds to a specific range increment. Counters having a plurality of serially connected flip-flops may operate such that the output of each of the flip-flops changes state upon receiving a negative-going edge of an input pulse. Other counters that can be used as a range counter are described by Montgomery Phister, in Logical Design of Digital Computers, John Wiley & Sons, Feb. 1959, pp. 248–279.

The minimum range flip-flop 44 and the maximum range flip-flop 46 can be Set-Clear (S-C) flip-flops. S-C flip-flops operate such that when a signal is received at the C or Clear input the output will change state such that the Q output will be 0 and the $\overline{Q}$ output will be 1. If the Q output is 0 and the $\overline{Q}$ output 1 when a signal is received at the clear input, the outputs will remain in the same state. If a signal is received at the S or Set input of an S-C flip-flop, the output will change state such that the Q output will be in the 1 state and the $\overline{Q}$ output will be in the 0 state. If the Q output is 1 and the $\overline{Q}$ output 0 when a signal is received at the Set input, the output will remain in the same state. The operation of an S-C flip-flop is further illustrated by the following truth table.

| S | C | $Q_{(n+1)}$ |
|---|---|---|
| 0 | 0 | X |
| 0 | 1 | 1 |
| 1 | 0 | 0 |
| 1 | 1 | . |

0 = enabling set or clear
$Q_n$ = status of Q output prior to initiating signal
$Q_{(n+1)}$ = status of Q output after initiation of signal The Set input of the minimum range flip-flop 44 is coupled to receive a MINIMUM RANGE SET signal from a pickoff point on the range counter 42 that is generated at the output of one of the serially connected flip-flops in the range counter. The MINIMUM RANGE SET signal corresponds to the minimum range that the range of a target is desired. The Set input s of the maximum range flip-flop 46 is coupled to receive a MAXIMUM RANGE SET signal from another pickoff point of the range counter 42 that is generated at the output of another one of the serially connected flip-flops in the range counter 42. The MAXIMUM RANGE SET signal corresponds to the maximum range that the range of a target is desired. The minimum range flip-flop 44 and maximum range flip-flop 46 can be SN 5474 flip-flops, manufactured by Texas Instruments, Incorporated, and described in their catalog, 1967–68 Integrated Circuits Catalog, p. 1024.

A MINIMUM RANGE INHIBIT signal is produced at the $\overline{Q}$ output of the minimum range flip-flop 44, and a MAXIMUM RANGE INHIBIT signal is produced at the Q output of the maximum range flip-flop 46. The gate circuit 48 receives the MINIMUM RANGE INHIBIT signal and the MAXIMUM RANGE INHIBIT signal and produces a MINIMUM-MAXIMUM RANGE signal during the period of time in which both the MINIMUM RANGE INHIBIT signal and MAXIMUM RANGE INHIBIT signal are low. The gate circuit includes a minimum range inverter gate 49 and a maximum range inverter gate 50.

The minimum range inverter gate 49 receives the MINIMUM RANGE INHIBIT signal from the $\overline{Q}$ output of the minimum range flip-flop 44. The maximum range inverter gate receives the MAXIMUM RANGE INHIBIT signal from the Q output of the maximum range flip-flop 46. The minimum range inverter gate 49 and maximum range inverter gate 50 can be DTL946 inverter gates that are manufactured by Texas Instruments, Incorporated, and described in their catalog SN 15–946 in the 1967–68 Integrated Circuits Catalog, p. 3,017.

When DTL946 inverter gates are used for the minimum range inverter gate 49 and maximum range inverter gate 50 have their outputs connected in parallel circuit relationship, as illustrated in FIG. 5, they operate to produce the MINIMUM-MAXIMUM RANGE signal only when the inputs to both the inverter gates are low, as illustrated in FIG. 6d and 6e.

The gate means 18 operates substantially as described for the gate means 18 illustrated in FIG. 1. However, in this embodiment, as described, the K input of the first flip-flop 20 will be high, only for that period of time when the MINIMUM-MAXIMUM RANGE signal from the gate circuit 48 is produced and received at the K input of the first flip-flop 20.

Referring now to the operation of the circuit illustrated in FIG. 5, the gate means 18 receives the $\overline{\text{RESET}}$ signal, the A TRIGGER signal, the video signal and the clock pulse signal as previously described for FIG. 1. These signals are reproduced in FIG. 6a, 6b, 6c and FIG. 6d respectively, for clarity. The $\overline{\text{RESET}}$ signal is first received by the gate means 18 and the counter means 40. When the $\overline{\text{RESET}}$ signal is received by the gate means 18, the first flip-flop 20 and second flip-flop 22 in the gate means 18 are set to the required initial conditions such that the $\overline{Q}$ outputs are high, and the Q outputs are low. The $\overline{\text{RESET}}$ signal is also received by the minimum range flip-flop 44 and maximum range flip-flop 46 in the counter means 40 and sets the flip-flops in the required initial condition such that the Q outputs will be low and the $\overline{Q}$ outputs will be high. When the $\overline{Q}$ output of the minimum range flip-flop 44 is high and the Q output of the maximum range flip-flop is low, the MINIMUM RANGE INHIBIT signal will be high and the MAXIMUM RANGE INHIBIT signal will be low accordingly. When the MINIMUM RANGE INHIBIT signal is high and the MAXIMUM RANGE INHIBIT signal is low, the output of the gate circuit 48 will be low, since the input to both the minimum range inverter gate 49 and the maximum range inverter gate 50 must be low before the MINIMUM-MAXIMUM RANGE signal will be produced by the gate circuit 48.

The K input of the first flip-flop 20 of the gate means 18 is coupled to receive the output MINIMUM-MAXIMUM RANGE signal from the gate circuit 48. Since the output of the gate circuit 48 is low, the K input of the first flip-flop 20 will be low accordingly. When the K input of the first flip-flop 20 is low, the Q output of the first flip-flop 20 will go high when a VIDEO signal is received at the clock pulse input c.p. during the A TRIGGER signal time and will not go low until a subsequent reflected VIDEO signal is received when the K input is high.

Subsequently, when a reflected VIDEO signal is received at the clock pulse input c.p. of the first flip-flop 20 the outputs of the first flip-flop 20 will change state such that the Q output will go high and $\overline{Q}$ output will go low. When the Q output of the first flip-flop 20 goes high, the J input and K input of the second flip-flop 22, which are coupled to the Q output, are also high. When the J input and the K input of the second flip-flop 22 are high, the Q output of the second flip-flop 22 will change state when each positive-going leading edge of the CLOCK PULSE signal is received at the clock pulse input c.p. and produce a pulse train signal as illustrated in FIG. 6g. Consequently, the second flip-flop 22 of the gate means 18 produces a pulse train. The second flip-flop 22 will continue to generate the pulse train until the J and K inputs of the second flip-flop 22 go low. The J and K inputs of the second flip-flop 22 will go low when the Q output of the first flip-flop 20 goes low.

The range counter 42 receives the pulse train generated by second flip-flop 22 and performs a count operation through its serially connected flip-flops. When the pickoff point that is coupled to the set input s of the minimum range flip-flop 44 reaches the desired minimum range, the MINIMUM RANGE SET signal will be generated and the minimum range flip-flop 44 will be set causing the output to change states, such that the Q output will go high and the $\overline{Q}$ output will go low. When the $\overline{Q}$ output of the minimum range flip-flop 44 goes low, the MINIMUM RANGE INHIBIT signal that is generated by the minimum range flip-flop 44 and received by the minimum range inverter gate 49 is low. When the MINIMUM RANGE INHIBIT signal is low, the MINIMUM-MAXIMUM RANGE signal produced by the gate circuit 48 will be initiated.

When the MINIMUM-MAXIMUM RANGE signal is produced by the gate circuit 48, the K input of the first flip-flop 20 in the gate means 18 will be high and any VIDEO signal that is received at the clock pulse input c.p. of the first flip-flop 20 will cause the Q output to change state such that the Q output will go low, causing the J and K inputs of the second flip-flop 22 to go low. When the J and K inputs of the second flip-flop 22 are low, the second flip-flop 22 will not be triggered in response to the positive-going leading edge, as described for FIG. 1, of the CLOCK PULSE signal and the pulse train will be terminated, as illustrated in FIG. 6g.

However, if no reflected VIDEO signal is received at the clock pulse input c.p. of the first flip-flop 20 prior to the time that the range counter 42 reaches the desired maximum range, the pulse train will be continually generated until the $\overline{\text{RESET}}$ signal is again received. When the desired maximum range is reached, the set terminal s of maximum range flip-flop 46 receives the MAXIMUM RANGE SET signal from the range counter 42 which sets the maximum range flip-flop 46, causing the outputs to change state such that the Q output goes high and the $\overline{Q}$ output goes low, and the output pulse that is produced by the gate circuit 48 is discontinued. When the output pulse produced by the gate circuit 48 is discontinued, the K input to the first flip-flop 20 of the gate means 18 is low. When the K input of the first flip-flop 20 is low, the output of the first flip-flop 20 will not change state when a reflected VIDEO signal is received. Consequently, if no reflected VIDEO signal is received at the clock pulse input c.p. of the first flip-flop 20 during the period of time when the MINIMUM-MAXIMUM RANGE signal from the gate circuit 48 is being generated, the pulse train from the second flip-flop 22 of the gate means 18 will continue to be produced until the $\overline{\text{RESET}}$ signal is again received.

If a VIDEO signal due to target reflection is received after the minimum range is reached and prior to the maximum range, the pulse train produced by the gate means 18 and fed to the range counter 42 will be terminated, and the accumulated count of pulses in the counter can be converted to range.

Referring now to FIG. 7, there is shown a block diagram of the embodiment in which only those VIDEO signals that are received subsequent to the receiving of the MINIMUM RANGE SET signal by the minimum range flip-flop 44 and prior to the receiving of the MAXIMUM RANGE SET signal by the maximum range flip-flop 46 will cause the pulse train to be terminated.

Structurally, the embodiment includes a first flip-flop 30 and a second flip-flop 32 in a gate means 38, each having a plurality of J inputs $J_1$, $J_2$ and $J^*$ and a plurality of K inputs $K_1$, $K_2$ and $K^*$. When flip-flops having a plurality of J inputs and a plurality of K inputs are used in the gate means 38, all the J inputs must be enabled when a pulse is received at the clock pulse input c.p. to change the state of the Q output from the low state to the high state. If the Q output is high, it will change to the low state only if all the K inputs are enabled when a pulse is received at the clock pulse input.

The above-described flip-flop can be more fully understood upon reference to the following truth table.

| J | K | $Q_{(n+1)}$ |
|---|---|---|
| 0 | 0 | $Q_n$ |
| 0 | 1 | 0 |
| 1 | 0 | 1 |
| 1 | 1 | $\overline{Q_n}$ | where $J = J_1 \cdot J_2 \cdot \overline{J^*}$

| J | $J_1$ | $J_2$ | $J^*$ |
|---|---|---|---|
| 0 | 0 | 0 | 0 |
| 0 | 0 | 0 | 1 |
| 0 | 0 | 1 | 1 |
| 0 | 0 | 1 | 0 |
| 1 | 1 | 1 | 0 |
| 0 | 1 | 1 | 1 |
| 0 | 1 | 0 | 1 |
| 0 | 1 | 0 | 0 | and where $K = K_1 \cdot K_2 \cdot \overline{K^*}$

| K | $K_1$ | $K_2$ | $K^*$ |
|---|---|---|---|
| 0 | 0 | 0 | 0 |
| 0 | 0 | 0 | 1 |
| 0 | 0 | 1 | 1 |
| 0 | 0 | 1 | 0 |
| 1 | 1 | 1 | 0 |
| 0 | 1 | 1 | 1 |
| 0 | 1 | 0 | 1 |
| 0 | 1 | 0 | 0 |

The first flip-flop 30 is coupled to receive the $\overline{\text{RESET}}$ signal, A TRIGGER signal, VIDEO signal, a MINIMUM RANGE ENABLE signal, and a MAXIMUM RANGE ENABLE signal. More specifically: the $J_1$ input of the first flip-flop 30 is coupled to receive the A TRIGGER signal; the $J_2$ input is coupled to a positive voltage causing it to be continually enabled; the $J^*$ input is coupled to a ground terminal causing it to be continually enabled; the $K_1$ input is coupled to receive the MINIMUM RANGE ENABLE signal; the $K_2$ input is coupled to receive the MAXIMUM RANGE ENABLE signal; and the $K^*$ input is coupled to ground causing it to be continually enabled.

The second flip-flop 32 is coupled to receive the $\overline{\text{RESET}}$ signal, and the CLOCK PULSE signal, and the Q output signal of the first flip-flop 30. The $J_1$ input and $K_1$ input are coupled to a constant voltage terminal causing them to be continually enabled; the $J_2$ input and $K_2$ input are coupled to receive the Q output of the first flip-flop 30. And the $J^*$ and $K^*$ inputs are coupled to a ground causing them to be continually enabled. The clock pulse input c.p. of the second flip-flop 32 is coupled to receive the CLOCK PULSE signal.

The counting means 40 includes a range counter 42, a minimum range flip-flop 44 and a maximum range flip-flop 46. In this embodiment, the gate circuit is eliminated since the MINIMUM RANGE ENABLE signal and MAXIMUM RANGE ENABLE signal can be coupled directly to the inputs of the first flip-flop 30. The range counter 42 is coupled to receive the Q output of the second flip-flop 32 in the gate means 38. The Set input s of the minimum range flip-flop 44 is coupled to receive the MINIMUM RANGE SET signal from a pickoff point in the range counter 42. The Set input s of the maximum range flip-flop 46 is coupled to receive the MAXIMUM RANGE SET signal from another pickoff point in the range counter 42. The MINIMUM RANGE ENABLE signal is generated by the Q output of the minimum range flip-flop 44 and the MAXIMUM RANGE ENABLE signal is generated by the $\overline{Q}$ output of the maximum range flip-flop 46.

Referring now to the operation of the circuit illustrated in FIG. 7, the $\overline{\text{RESET}}$ signal is first received by the gate means 38 and the counter means 40. The $\overline{\text{RESET}}$ signal sets the first flip-flop 30 and the second flip-flop 32 in the gate means 38 to the required initial conditions such that the $\overline{Q}$ outputs are high and the Q outputs are low. The $\overline{\text{RESET}}$ signal is also received by the minimum range flip-flop 44 and the maximum range flip-flop 46 in the counter means 40. The $\overline{\text{RESET}}$ signal sets the minimum range flip-flop 44 and the maximum range flip-flop 46 to the required initial conditions such that the Q outputs will be low and the $\overline{Q}$ outputs will be high.

When the outputs of the minimum range flip-flop 44 and maximum range flip-flop 46 are in the required initial conditions, the MAXIMUM RANGE ENABLE signal will be high and the MINIMUM RANGE ENABLE signal will be low. When the MAXIMUM RANGE ENABLE signal is high, the $K_2$ input of the first flip-flop 30, to which it is applied, is high. When the MINIMUM RANGE ENABLE signal is low, the $K_1$ input of the first flip-flop 30 to which it is fed, is low. When the $K_1$ input of the first flip-flop 30 is low and the $K_2$ input high, the Q output of the first flip-flop 30 can change to the high state only when a VIDEO signal is received at the clock pulse input coincident with the A TRIGGER signal, and cannot go low again until the $K_1$ and $K_2$ inputs are high. Thus, when a VIDEO signal is received at the clock pulse input c.p. of the first flip-flop 30 during the A TRIGGER signal time, the $J_1$ and $J_2$ inputs will be high, whereupon the Q output will go high and $\overline{Q}$ output will go low. When the Q output of the first flip-flop 30 is high, the $J_2$ and $K_2$ inputs of the second flip-flop 32 to which it is coupled goes high, and the Q output of the second flip-flop 32 will change state when each positive-going leading edge of the CLOCK PULSE signal is received at the clock pulse input c.p. as described previously. Consequently, a pulse train will be generated at the Q output of the second flip-flop 32. The pulse train will continue to be generated until the $J_2$ and $K_2$ inputs of the second flip-flop 32 go low.

The $J_2$ and K inputs of the second flip-flop 32 will remain high until the Q output of the first flip-flop 30 goes low. The Q output of the first flip-flop 30 will go low only if a reflected VIDEO signal is received at the clock pulse input c.p. when both the MAXIMUM RANGE ENABLE signal fed to the $K_1$ input and the MINIMUM RANGE ENABLE signal fed to the $K_2$ input of the first flip-flop 30 are high.

The range counter 42 receives the pulse train from the Q output of the second flip-flop 32 in the gate means 38 and performs count operations thereon through serially connected flip-flops. When the pickoff point that is coupled to the Set input s of the minimum range flip-flop 44 reaches the desired minimum range, the MINIMUM RANGE SET signal will be produced, which will set the minimum range flip-flop 44, and cause the outputs to change state such that the Q output will go high and the $\overline{Q}$ output will go low.

When the Q output of the minimum range flip-flop 44 is high, the $K_1$ input of the first flip-flop 30, to which it is coupled, is high. Therefore, after the minimum range flip-flop 44 receives the MINIMUM RANGE SET signal, both the $K_1$ input and $K_2$ input to the first flip-flop 30 will be high. As described above, when the $K_1$ and $K_2$ input of the first flip-flop 30 are both high, any reflected VIDEO signal that is received at the clock pulse input c.p. of the first flip-flop 30 will cause the output to change state such that the Q output will go low. When the Q output of the first flip-flop 30 goes low, the $J_2$ input and $K_2$ input of the second flip-flop 32 go low, and the output of the second flip-flop 32 will not change states in response to the next positive-going leading edge of the CLOCK PULSE signal and the pulse train is discontinued.

When the range counter 42 reaches the desired maximum range, the MAXIMUM RANGE SET signal will be produced by the range counter which will set the maximum range flip-flop 46. When the MAXIMUM RANGE SET signal is received at the set terminal s of the maximum range flip-flop 46, the outputs will change state such that the Q output will go high and the $\overline{Q}$ output will go low. When the $\overline{Q}$ output of the maximum range flip-flop 46 is low, the $K_2$ input of the first flip-flop 30, to which it is coupled, will be low. When the $K_2$ input of the first flip-flop 30 is low, the Q output thereof cannot change to the low state in response to a VIDEO signal received at the clock pulse input c.p.

Consequently, if a VIDEO signal is received at the clock pulse input c.p. of the first flip-flop 30 subsequent to the time when the MAXIMUM RANGE INHIBIT signal is low, the Q output of the first flip-flop 30 will stay high. If the Q output of the first flip-flop 30 stays high, the $J_2$ and $K_2$ inputs of the second flip-flop 30 will remain high, and the pulse train will continue to be generated until the $\overline{\text{RESET}}$ signal is again received.

Figure 8:
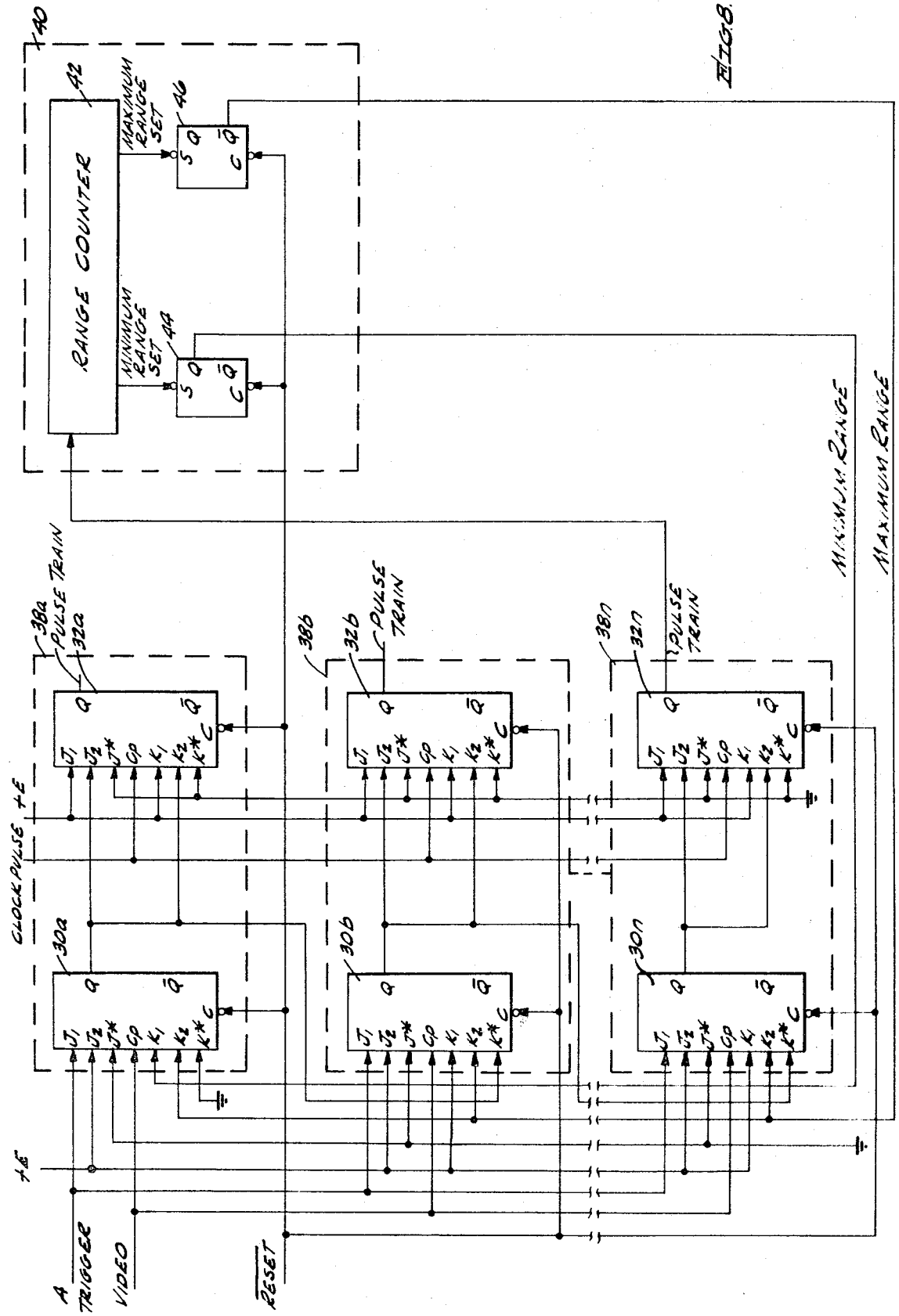
FIG. 8 is a block diagram of a plurality of the gate means illustrated in FIG. 7 that is connected in parallel circuit relationship.

Referring now to FIG. 8, there is shown a plurality of gate means 38a through 38n, of the type illustrated in FIG. 7, connected in parallel circuit relationship and the counter means 40 for determining the range of a plurality of targets that are within certain minimum and maximum range limits.

Generally, all of the gate means are responsive to the transmitted VIDEO signal and the A TRIGGER signal to initiate simultaneous pulse trains. Each subsequent gate means is responsive to the preceding gate means so that VIDEO signals reflected from a plurality of targets sequentially discontinues the pulse trains produced by each gate means.

Structurally, the K* inputs of each of the first flip-flops 30b through 30n of each subsequent one of the plurality of gate means 38b through 38n is coupled to receive the Q output of the first flip-flop 30a through 30n−1 of the preceding gate means 38a through 38n−1 until the K* input of the first flip-flop 30n of the nth gate means 38n is coupled to receive the Q output of the first flip-flop of the n−1 gate means. Only the $K_1$ input of the first flip-flop 30a of the first gate means 38a is coupled to receive the MINIMUM RANGE ENABLE signal from the minimum range flip-flop 44. Each of the plurality of gate means 38a through 38n is coupled to receive the A TRIGGER signal, the VIDEO signal, the $\overline{\text{RESET}}$ signal, the MAXIMUM RANGE ENABLE signal, and the CLOCK PULSE signal as described above.

Referring now to the details of the operation of the circuit illustrated in FIG. 8, the $\overline{\text{RESET}}$ signal is first received by each of the plurality of gate means 38a through 38n and the counter means 40, to set the first flip-flops, 30a through 30n, the second flip-flops, 32a through 32n, the minimum range flip-flop 44, and the maximum range flip-flop 46 to the required initial conditions. The required initial conditions are that the Q outputs be low and the $\overline{Q}$ outputs be high. Subsequently, when a VIDEO signal is received coincidentally with the A TRIGGER signal, the outputs of all the first flip-flops 30a through 30n of the plurality of gate means 38a through 38n will change states such that the Q outputs will go high and the $\overline{Q}$ outputs will go low. When the Q output of the first flip-flops 30a through 30n are high, the $J_2$ and $K_2$ inputs of the second flip-flops 32a through 32n, to which it is coupled, are high, and a pulse train will be produced by each of the second flip-flops, 32a through 32n, in response to the CLOCK PULSE signal as described previously. The pulse train from each of the second flip-flops 32a through 32n will be produced until the $J_2$ and $K_2$ inputs are low. The $J_2$ and $K_2$ inputs will be high until the Q output of each of the first flip-flops 30a through 30n goes low. The Q outputs of the first flip-flops 30a through 30n will go low when a reflected VIDEO signal is received at the clock pulse input c.p. of the first flip-flops, 30a through 30n, during a time when both the $K_1$ and $K_2$ inputs are high and the K* input is low.

When the desired minimum range is reached, the Q output of the minimum range flip-flop 44 will go high and the MINIMUM RANGE ENABLE signal will be generated as described for FIG. 7. When the MINIMUM RANGE ENABLE signal is generated, the $K_1$ input of the first flip-flop 30a of the first gate means 38a, to which it is applied, is high. Also, the $K_2$ input is high until the maximum range is reached as described for FIG. 7.

Subsequently, after the desired minimum range is reached, any VIDEO signal will cause the output of the first flip-flop 30a of the first gate means 38a to change state such that the Q output will go low and the $\overline{Q}$ output will go high. When the Q output of the first flip-flop 30a goes low, the $J_2$ and $K_2$ inputs of the second flip-flop 32a of the first gate means 38a, to which it is applied, goes low and the pulse train generated therefrom is discontinued. Also, when the Q output of the first flip-flop 30a of the first gate means 38a goes low, the K* input of the first flip-flop 30b of the second gate means 38b, to which it is also coupled, goes low. Since the $K_1$ and $K_2$ inputs of the first flip-flop 30b of the second gate means 38b are high and the K* input is now low, the output of the first flip-flop 30b of the second gate means 38b can change state upon the receipt of a subsequent reflected VIDEO signal.

When the next reflected VIDEO signal is received at the clock pulse inputs c.p., the first flip-flop 30b of the second gate means 38b will change state such that the Q output will go low and the $\overline{Q}$ will go high. When the $\overline{Q}$ output of the first flip-flop 30b of the second gate means goes low, the $J_2$ and $K_2$ inputs of the second flip-flop 32b, to which it is coupled, goes low, and the pulse train generated by the second flip-flop 38b is discontinued.

The sequence of discontinuing the pulse trains that are generated by subsequent gate means by the condition of the preceding gate means will continue upon the receipt of subsequent reflected VIDEO signals until either the desired MAXIMUM RANGE ENABLE signal is discontinued, or until the pulse train generated by the nth gate means 38n is discontinued. When the maximum range limit is reached, the MAXIMUM RANGE ENABLE signal produced at the $\overline{Q}$ output of flip-flop 46 will go low and the $K_2$ inputs of all the first flip-flops, 30a through 30n, to which it is fed, will go low, and the Q outputs thereof cannot change state until the $\overline{\text{RESET}}$ signal is again received by the circuit. Thus, the gate means will not discontinue generating the pulse trains in response to reflected VIDEO signals until the $\overline{\text{RESET}}$ signal is received which resets all the flip-flops in the gate means and counters to the required initial conditions previously described.

What is claimed is:

1. A range gate circuit comprising:
    a first flip-flop coupled to receive a plurality of gate signals for producing a pulse signal, said flip-flop initiating the pulse signal in response to one of the plurality of gate signals that corresponds to a transmitted range pulse and discontinuing the pulse signal in response to another of the plurality of gate signals that corresponds to a reflected range pulse energy signal; and
    a second flip-flop coupled to receive the pulse signal produced by said first flip-flop and a clock pulse signal for producing a pulse train output signal only when the pulse signal from said first flip-flop is received, the pulse train output signal having a frequency related to the frequency of the clock pulse signal.

2. The circuit of claim 1 in which said first flip-flop is a J-K flip-flop having inputs for receiving the plurality of gate signals and an output for conducting the pulse signal to said second flip-flop.

3. The circuit of claim 2 in which said second flip-flop is a J-K flip-flop having inputs for receiving the pulse signal conducted by said first flip-flop and an output for conducting the pulse train output signal.

4. The circuit of claim 1 in which said second flip-flop is a J-K flip-flop having inputs for receiving the pulse signal produced by said first flip-flop and an output for conducting the pulse train output signal.

5. A gate circuit for determining the range of a plurality of targets comprising:
a plurality of gate means, including a first gate means, each of said gate means being coupled to receive a plurality of gate signals and a clock pulse signal for producing a pulse train in response to a transmitted range pulse and a reflected range pulse energy signal, each of said gate means being connected to another of said gate means so that the pulse train from each of said gate means is sequentially discontinued.

6. The circuit of claim 5 in which each of the plurality of gate means includes:
a first flip-flop coupled to receive a plurality of gate signals for producing a pulse signal, said first flip-flop initiating the pulse signal in response to one of the plurality of gate signals that correspond to a transmitted range pulse and discontinuing the pulse signal in response to another of the plurality of gate signals that corresponds to a reflected range pulse energy signal; and
a second flip-flop coupled to receive the pulse signal produced by said first flip-flop and a clock pulse signal for producing a pulse train output signal for producing a pulse train output signal only when the pulse signal from said first flip-flop is received, the pulse train output signal having a frequency related to the frequency of the clock pulse signal.

7. The circuit of claim 6 in which said first flip-flop is a J-K flip-flop having inputs for receiving the plurality of gate signals and an output for conducting the pulse signal to said second flip-flop.

8. The circuit of claim 7 in which said second flip-flop is a J-K flip-flop having inputs for receiving the pulse signal conducted by said first flip-flop and an output for conducting the pulse train output signal.

9. The circuit of claim 6 in which said second flip-flop is a J-K flip-flop having inputs for receiving the pulse signal conducted by said first flip-flop and an output for conducting the pulse train output signal.

10. A gate circuit comprising:
a first flip-flop coupled to receive a plurality of gate signals and a minimum-maximum range signal, for producing a pulse signal in response to transmitted and reflected range gate signals of the plurality of gate signals and the minimum-maximum range signal;
a second flip-flop coupled to receive the pulse signal from said first flip-flop and a clock pulse signal for producing a pulse train when the pulse signal is received, the pulse train having a frequency related to the frequency of the clock pulse signal; and
a counter means coupled to receive the pulse train for producing the minimum-maximum range signal when the pulse train count is within predetermined limits.

11. The circuit of claim 10 in which said first flip-flop is a J-K flip-flop having inputs for receiving the plurality of gate signals and an output for conducting the pulse signal to said second flip-flop.

12. The circuit of claim 11 in which said second flip-flop is a J-K flip-flop having inputs for receiving the pulse signal conducted by said first flip-flop and an output for conducting the pulse train output signal.

13. The circuit of claim 12 in which said counter means includes a range counter coupled to receive the pulse train for producing a minimum range set signal and a maximum range set signal in response to the number of pulses received;
a minimum range flip-flop coupled to receive the minimum range set signal for producing a minimum range inhibit signal in response thereto;
a maximum range flip-flop coupled to receive the maximum range set signal for generating a maximum range inhibit signal in response thereto; and
a gate circuit coupled to receive the minimum range inhibit signal and the maximum range inhibit signal for producing the minimum-maximum signal.

14. The circuit of claim 13 in which said gate circuit includes a minimum range inverter gate and a maximum range inverter gate, said minimum range inverter gate being coupled to receive the minimum range inhibit signal, said maximum range inverter gate being coupled to receive the maximum range inhibit signal, said minimum range inverter gate and said maximum range inverter gate produce the minimum-maximum range signal in response to the received signals.

15. The circuit of claim 11 in which said counter means includes a range counter coupled to receive the pulse train for producing a minimum range set signal and a maximum range set signal in response to the number of pulses received;
a minimum range flip-flop coupled to receive the minimum range set signal for producing a minimum range inhibit signal in response thereto;
a maximum range flip-flop coupled to receive the maximum range set signal for generating a maximum range inhibit signal in response thereto; and
a gate circuit coupled to receive the minimum range inhibit signal and the maximum range inhibit signal for producing the mainimum-maximum signal.

16. The circuit of claim 15 in which said gate circuit includes a minimum range inverter gate and a maximum range inverter gate, said minimum range inverter gate being coupled to receive the minimum range inhibit signal, said maximum range inverter gate being coupled to receive the maximum range inhibit signal, said minimum range inverter gate and said maximum range inverter gate produce the minimum-maximum range signal in response to the received signals.

17. The circuit of claim 10 in which said second flip-flop is a J-K flip-flop having inputs for receiving the pulse signal produced by said first flip-flop and an output for conducting the pulse train output signal.

18. The circuit of claim 17 in which said counter means includes a range counter coupled to receive the pulse train for producing a minimum range set signal and a maximum range set signal in response to the number of pulses received;
a minimum range flip-flop coupled to receive the minimum range set signal for producing a minimum range inhibit signal in response thereto;
a maximum range flip-flop coupled to receive the maximum range set signal for generating a maximum range inhibit signal in response thereto; and
a gate circuit coupled to receive the minimum range inhibit signal and the maximum range inhibit signal for producing the minimum-maximum signal.

19. The circuit of claim 18 in which said gate circuit includes a minimum range inverter gate and a maximum range inverter gate, said minimum range inverter gate being coupled to receive the minimum range inhibit signal, said maximum range inverter gate being coupled to receive the maximum range inhibit signal, said minimum range inverter gate and said maximum range inverter gate produce the minimum-maximum range signal in response to the received signals.

20. The circuit of claim 10 in which said counter means includes a range counter coupled to receive the pulse train for producing a minimum range set signal and a maximum range set signal in response to the number of pulses received;
a minimum range flip-flop coupled to receive the minimum range set signal for producing a minimum range inhibit signal in response thereto;
a maximum range flip-flop coupled to receive the maximum range set signal for generating a maximum range inhibit signal in response thereto; and
a gate circuit coupled to receive the minimum range inhibit signal and the maximum range inhibit signal for producing the minimum-maximum signal.

21. The circuit of claim 20 in which said gate circuit includes a minimum range inverter gate and a maximum range inverter gate, said minimum range inverter gate being coupled to receive the minimum range inhibit signal, said maximum range inverter gate being coupled to receive the maximum range inhibit signal, said minimum range inverter gate and said maximum range inverter gate produce the minimum-maximum range signal in response to the received signals.

22. A gate circuit comprising:
a first flip-flop coupled to receive a plurality of gate signals, a minimum range enable signal and a maximum range enable signal for producing a pulse signal in response to transmitted and reflected range gate signals of the plurality of gate signals, the minimum range enable signal, and maximum range enable signal;
a second flip-flop coupled to receive the pulse signal from said first flip-flop and a clock pulse signal for producing a pulse train when the pulse signal is received, the pulse train having a frequency related to the frequency of the clock pulse signal; and
a counter means coupled to receive the pulse train for producing the minimum range enable signal when the pulse train count is at a first level and the maximum range enable signal when the pulse train count is at a second level.

23. The circuit of claim 22 in which said first flip-flop is a J-K flip-flop having a plurality of J inputs, a plurality of K inputs, and an output, said inputs being selectively coupled to receive the plurality of gate signals, the minimum range enable signal, and the maximum range enable signal, and said output being operable to conduct the pulse signal to said second flip-flop.

24. The circuit of claim 23 in which said counter means includes:
a range counter coupled to receive the pulse train for producing a minimum range set signal and a maximum range set signal;
a minimum range flip-flop coupled to receive the minimum range set signal for producing the minimum range enable signal; and
a maximum range flip-flop coupled to receive the maximum range set signal for producing the maximum range enable signal.

25. The circuit of claim 22 in which said second flip-flop is a J-K flip-flop having a plurality of J inputs, a plurality of K inputs, and an output, said inputs being selectively coupled to receive the pulse signal produced by said first flip-flop, and said output being operable to conduct the pulse train.

26. The circuit of claim 25 in which said first flip-flop is a J-K flip-flop having a plurality of J inputs, a plurality of K inputs, and an output, said inputs being selectively coupled to receive the plurality of gate signals, the minimum range enable signal and the maximum range enable signal, and said output being operable to conduct the pulse signal to said second flip-flop.

27. The circuit of claim 26 in which said counter means includes:
a range counter coupled to receive the pulse train for producing a minimum range set signal and a maximum range set signal;
a minimum range flip-flop coupled to receive the minimum range set signal for producing the minimum range enable signal; and
a maximum range flip-flop coupled to receive the maximum range set signal for producing the maximum range enable signal.

28. The circuit of claim 25 in which said counter means includes:
a range counter coupled to receive the pulse train for producing a minimum range set signal and a maximum range set signal;
a minimum range flip-flop coupled to receive the minimum range set signal for producing the minimum range enable signal; and
a maximum range flip-flop coupled to receive the maximum range set signal for producing the maximum range enable signal.

29. The circuit of claim 22 in which said counter means includes:
a range counter coupled to receive the pulse train for producing a minimum range set signal and a maximum range set signal;
a minimum range flip-flop coupled to receive the minimum range set signal for producing the minimum range enable signal; and
a maximum range flip-flop coupled to receive the maximum range set signal for producing the maximum range enable signal.

30. A gate circuit for determining the range of a plurality of targets, comprising:
a plurality of gate means including a first gate means, each of said gate means being coupled to receive a plurality of gate signals, a clock pulse signal, a minimum range enable signal and a maximum range enable signal, for generating a pulse train in response to a transmitted range pulse signal and a reflected range pulse energy signal, each of said gate means being connected to another of said gate means so that each of said gate means except said first gate means is responsive to a signal generated by another gate means for sequentially discontinuing the pulse train from each of said gate means; and
a counter means coupled to receive the pulse train generated by said first gate means for producing the minimum range enable signal and the maximum range enable signal being related to a number of pulses in the pulse train.

31. A circuit of claim 30 in which said plurality of gate means includes:
a first flip-flop coupled to receive selected ones of the plurality of gate signals for generating a pulse signal; and
a second flip-flop coupled to receive the pulse signal from said first flip-flop and a clock pulse signal for generating a pulse train when the pulse signal is received, the pulse train having a frequency related to the frequency of the clock pulse signal.

32. The circuit of claim 31 in which said first flip-flop is a J-K flip-flop having a plurality of J inputs, a plurality of K inputs, and an output, said inputs being selectively coupled to receive the selected ones of the plurality of gate signals, and said output being operable to conduct the pulse signal to said second flip-flop.

33. The circuit of claim 32 in which said counter means includes:
a range counter coupled to receive the pulse train for producing a minimum range set signal and a maximum range set signal in response to the number of pulses received;
a minimum range flip-flop coupled to receive the minimum range set signal for producing the minimum range enable signal in response to the received signal; and
a maximum range flip-flop coupled to receive the maximum range set signal for producing the maximum range enable signal in response to the received signal.

34. The circuit of claim 31 in which said second flip-flop is a J-K flip-flop having a plurality of J inputs, a plurality of K inputs, and an output, said inputs being selectively coupled to receive the pulse signal generated by said first flip-flop, and said output being operable to conduct the pulse train.

35. The circuit of claim 34 in which said first flip-flop is a J-K flip-flop having a plurality of J inputs, a plurality of K inputs, and an output, said inputs being selectively coupled to receive the selected ones of the plurality of gate signals, and said output being operable to conduct the pulse signal to said second flip-flop.

36. The circuit of claim 35 in which said counter means includes:
a range counter coupled to receive the pulse train for producing a minimum range set signal and a maximum range set signal in response to the number of pulses received;
a minimum range flip-flop coupled to receive the minimum range set signal for producing the minimum range enable signal in response to the received signal; and
a maximum range flip-flop coupled to receive the maximum range set signal for producing the maximum range enable signal in response to the received signal.

37. The circuit of claim 34 in which said counter means includes:
- a range counter coupled to receive the pulse train for producing a minimum range set signal and a maximum range set signal in response to the number of pulses received;
- a minimum range flip-flop coupled to receive the minimum range set signal for producing the minimum range enables signal in response to the received signal; and
- a maximum range flip-flop coupled to receive the maximum range set signal for producing the maximum range enable signal in response to the received signal.

38. The circuit of claim 31 in which said counter means includes:
- a range counter coupled to receive the pulse train for producing a minimum range set signal and a maximum range set signal in response to the number of pulses received;
- a minimum range flip-flop coupled to receive the minimum range set signal for producing the minimum range enable signal in response to the received signal; and
- a maximum range flip-flop coupled to receive the maximum range set signal for producing the maximum range enable signal in response to the received signal.

39. The circuit of claim 30 in which said counter means includes:
- a range counter coupled to receive the pulse train for producing a minimum range set signal and a maximum range set signal in response to the number of pulses received;
- a minimum range flip-flop coupled to receive the minimum range set signal for producing the minimum range enable signal in response to the received signal; and
- a maximum range flip-flop coupled to receive the maximum range set signal for producing the maximum range enable signal in response to the received signal.

* * * * *